United States Patent
Hwang et al.

(10) Patent No.: US 11,746,805 B2
(45) Date of Patent: Sep. 5, 2023

(54) VEHICULAR LOCKING UNIT

(71) Applicants: Hyundai Motor Company, Seoul (KR); Kia Corporation, Seoul (KR)

(72) Inventors: Jin Ho Hwang, Cheonan-Si (KR); Dong Eun Cha, Hwaseong-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/695,224

(22) Filed: Mar. 15, 2022

(65) Prior Publication Data
US 2022/0397138 A1 Dec. 15, 2022

(30) Foreign Application Priority Data
Jun. 10, 2021 (KR) .................. 10-2021-0075339

(51) Int. Cl.
*F16B 2/10* (2006.01)
*B60R 11/00* (2006.01)

(52) U.S. Cl.
CPC .......... *F16B 2/10* (2013.01); *B60R 2011/0059* (2013.01)

(58) Field of Classification Search
CPC ..... B60R 2011/0071; B60R 2011/0077; B60R 2011/0029; B60N 2/2806; F16B 2/10
See application file for complete search history.

(56) References Cited

U.S. PATENT DOCUMENTS

| 7,029,056 B2* | 4/2006 | Browne .................. E05B 77/08 |
| | | 292/DIG. 43 |
| 7,918,001 B2* | 4/2011 | Buckingham ........ B60N 2/2893 |
| | | 24/599.3 |
| 10,894,488 B2 | 1/2021 | Maloney et al. |
| 2011/0243653 A1* | 10/2011 | Buckingham ........ B60N 2/2863 |
| | | 403/322.4 |

FOREIGN PATENT DOCUMENTS

| JP | 6273790 | 2/2018 |
| KR | 20-0128840 Y1 | 8/1998 |
| KR | 10-1998-075948 | 11/1998 |

* cited by examiner

*Primary Examiner* — Robert Sandy
(74) *Attorney, Agent, or Firm* — MORGAN, LEWIS & BOCKIUS LLP

(57) ABSTRACT

A vehicular locking unit includes an engaging portion provided at an internal member of a vehicle to face an internal space in the vehicle, a hook portion, which is provided at an internal portion of the vehicle and which is selectively engaged with the engaging portion to attach the internal portion to the internal member in the internal space, and a locking mechanism, which is provided at the internal portion and which is coupled to the hook portion to selectively actuate the hook portion, whereby the hook portion is engaged with or disengaged from the engaging portion to attach the internal portion to the internal member or detach the same therefrom.

13 Claims, 3 Drawing Sheets

VEHICULAR LOCKING UNIT

CROSS-REFERENCE TO RELATED APPLICATION

The present application claims priority to Korean Patent Application No. 10-2021-0075339, filed on Jun. 10, 2021, the entire contents of which is incorporated herein for all purposes by this reference.

BACKGROUND OF THE INVENTION

Field of the Invention

The present invention relates to a vehicular locking unit configured to allow an internal portion, which is provided in the internal space in a purpose-built vehicle (PBV) according to the purpose of the vehicle, to be freely attached to or detached from the floor of the vehicle.

Description of Related Art

Although conventional vehicles have served only as transportation devices, recently, with the development of autonomous running technology, it has become possible for a passenger to perform various activities in addition to driving the vehicle.

At present, a complete autonomous running technology, which doesn't need a driver at all, is being developed. When the complete autonomous running technology becomes commercially available in the near future, there will be no need to separately provide a driver seat as in a conventional vehicle, and the internal space in the vehicle will be freely changeable into various configurations.

By such an autonomous running technology, PBVs, which allow a passenger to perform an activity for a certain purpose in the vehicle, are suggested. Unlike conventional vehicles, such PBVs need internal portions according to the purpose of the vehicle. For example, the PBVs may need beds for sleeping or tables and chairs for working.

Accordingly, such PBVs must be configured to allow an internal portion to be freely moved to a desired position in the internal space in the vehicle and to allow an internal portion to be attached to or detached from the vehicle according to the purpose of the vehicle. To the present end, there is demand for the development of a vehicular locking unit configured to allow an internal portion to be easily attached to or detached from the floor of a vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicular locking unit in which a hook portion provided at an internal portion of a vehicle, which needs to be provided in the internal space in the vehicle, is actuated to be engaged with or disengaged from an engaging portion provided on the upper surface of the floor of the vehicle, allowing the internal portion to be attached to or detached from the floor.

In accordance with various aspects of the present invention, the above and other objects may be accomplished by the provision of a vehicular locking unit including an engaging portion provided at an internal member of a vehicle to face an internal space in the vehicle, a hook portion, which is provided at an internal portion of the vehicle and which is selectively engaged with the engaging portion to attach the internal portion to the internal member in the internal space, and a locking mechanism, which is provided at the internal portion and which is coupled to the hook portion to selectively actuate the hook portion, whereby the hook portion is engaged with or disengaged from the engaging portion to attach the internal portion to the internal member or detach the same therefrom.

The engaging portion may be positioned on the upper surface of a floor of the vehicle, and the hook portion may be provided at a lower portion of the internal portion mounted on the floor.

The engaging portion may include at least one panel including a plurality of loops provided on the upper surface thereof, and the at least one panel may be coupled to a surface of the internal member to define a portion of the internal member.

The hook portion, provided at the internal portion, may include at least one pair of hooks, and the at least one pair of hooks may be oriented to face each other.

The pair of hooks may be brought close to each other to grab the engaging portion, locking the internal portion to the internal member, and the pair of hooks may be opened to release the engaging portion, unlocking the internal portion from the internal member.

The at least one pair of hooks may include a plurality of pairs of hooks, which are disposed in at least one row, and the plurality of pairs of hooks included in each row may be actuated together by the locking mechanism.

The at least one pair of hooks may be disposed in a recess depressed from a surface of the internal portion to prevent the pair of hooks from interfering with a surface of the internal member when the pair of hooks is opened.

The at least one pair of hooks may be rotated in opposite directions to be engaged with or disengaged from the engaging portion.

The locking mechanism may include a first pinion connected to one of the pair of hooks, a second pinion connected to a remaining one of the pair of hooks, a first rack engaged with the first pinion, and a second rack engaged with the second pinion, the first rack and the second rack being moved in opposite directions to each other.

The locking mechanism may further include a third pinion provided between the first rack and the second rack, and the third pinion may be engaged with the first rack and the second rack to move the first rack and the second rack in opposite directions upon rotation to each other thereof.

The locking mechanism may further include an actuator provided coupled to the third pinion, the actuator rotating the third pinion in a first direction or in a second direction opposite to the first direction to engage the hook portion with the engaging portion or to disengage the hook portion from the engaging portion.

The hook portion may include a plurality of pairs of hooks, and the locking mechanism may include a plurality of pinions respectively connected to the plurality of pairs of hooks and a plurality of racks engaged with respective pinions so that the plurality of pairs of hooks is rotated by the respective pinions, which are rotated by movement of the racks in one direction or in a direction opposite to the one direction, to be engaged with or disengaged from the engaging portion.

Each pair of hooks may be positioned at a point spaced from two corresponding ones of the plurality of pinions, and may receive driving force via shafts respectively connecting the pair of hooks to the two corresponding ones of the plurality of pinions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
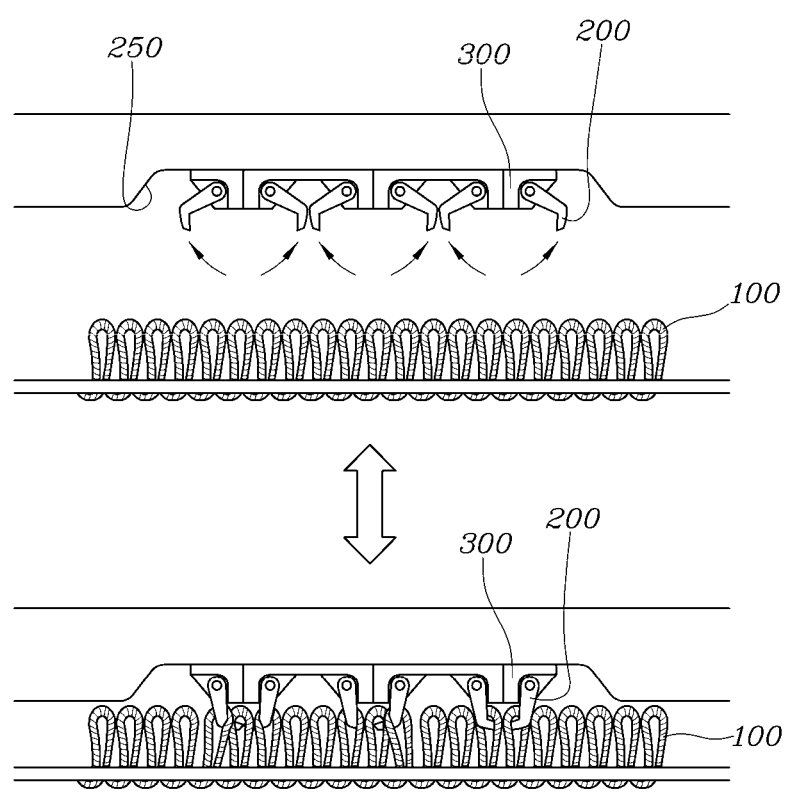
FIG. 1 is a view exemplarily illustrating a vehicular locking unit according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like portions.

Figure 2:
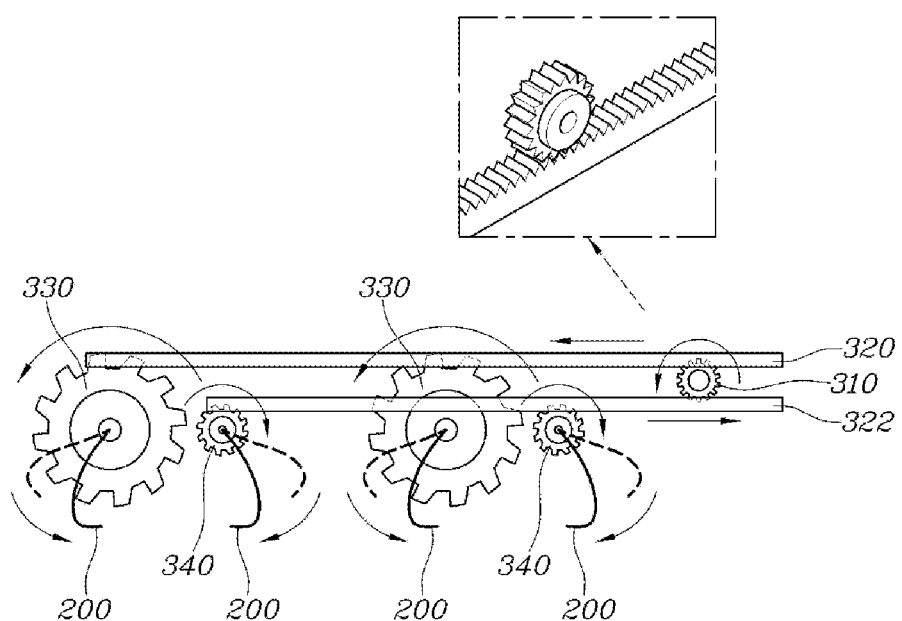
FIG. 2 is a front view exemplarily illustrating the hook portion of the vehicular locking unit according to various exemplary embodiments of the present invention, which is actuated by a rack-and-pinion mechanism.
Figure 3:
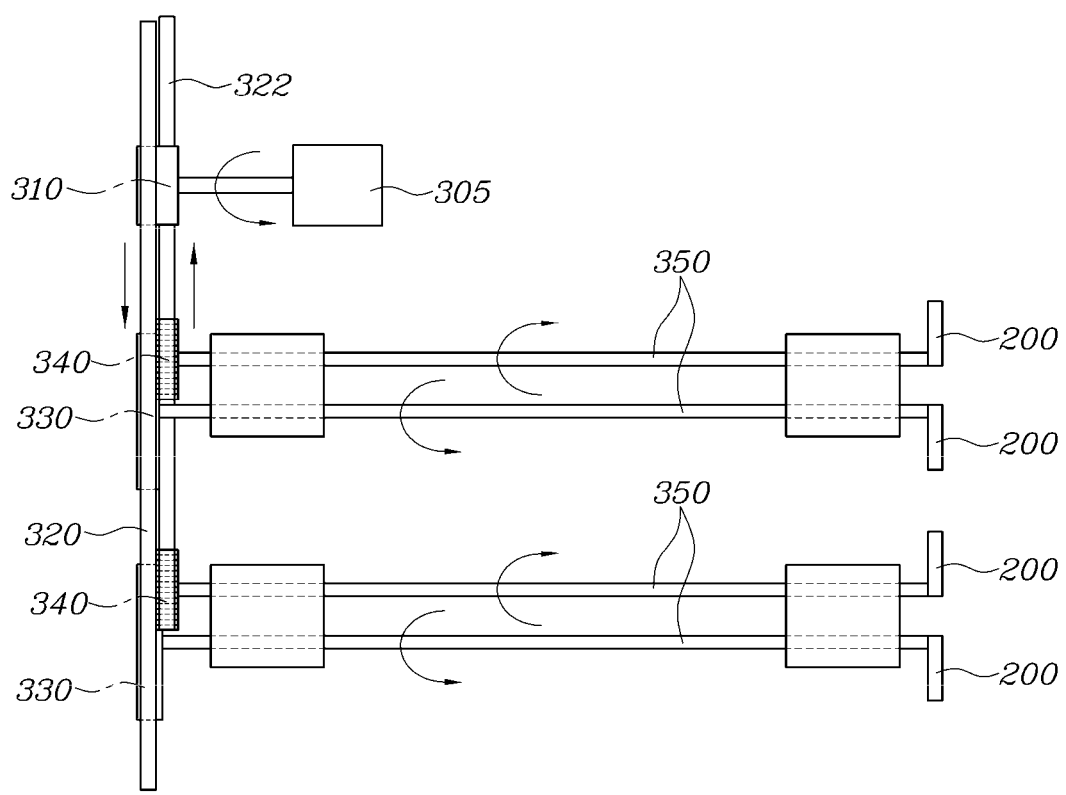
FIG. 3 is a plan view exemplarily illustrating the vehicular locking unit according to various exemplary embodiments of the present invention in which the hook portions are actuated through the rack-and-pinion mechanism.

FIG. 1 is a view exemplarily illustrating a vehicular locking unit according to various exemplary embodiments of the present invention. FIG. 2 is a front view exemplarily illustrating the hook portion of the vehicular locking unit according to various exemplary embodiments of the present invention, which is actuated by a rack-and-pinion mechanism. FIG. 3 is a plan view exemplarily illustrating the vehicular locking unit according to various exemplary embodiments of the present invention in which the hook portions are actuated through the rack-and-pinion mechanism.

FIG. 1 is a view exemplarily illustrating a vehicular locking unit according to various exemplary embodiments of the present invention. As illustrated in FIG. 1, a vehicular locking unit according to various exemplary embodiments of the present invention includes an engaging portion 100, which is provided at an internal member of a vehicle to face the internal space in the vehicle, a hook portion 200, which is provided at an internal portion of the vehicle to face the engaging portion 100 and which is engaged with the engaging portion 100 to attach the internal portion of the vehicle to the internal member in the internal space in the vehicle, and a locking mechanism 300, which is provided at the internal portion of the vehicle and is coupled to the hook portion 200 to actuate the hook portion 200 such that the hook portion 200 is engaged with or disengaged from the engaging portion 100 to attach the internal portion of the vehicle to the internal member or remove the internal portion of the vehicle from the internal member.

In the vehicular locking unit according to various exemplary embodiments of the present invention, the engaging portion 100 may be positioned on the upper surface of the floor of the vehicle, and the hook portion 200 may be provided at the lower portion of the internal portion of the vehicle attached to the floor of the vehicle. For example, the internal portion of the vehicle may include a seat or a table, and at least one hook portion 200 may be provided at the lower end portion of the seat or the table.

In the vehicular locking unit according to various exemplary embodiments of the present invention, the engaging portion 100 may include at least one panel including a plurality of loops provided on the upper surfaces thereof, and the at least one panel may be coupled to one surface of the internal member of the vehicle to form a portion of the internal member.

The internal portion of the vehicle may be freely disposed in the internal space of a PBV (Purpose-built vehicle) according to the type of activity of a passenger in the internal space, and the at least one panel may form a portion of one surface of the internal member, such as the floor of the vehicle. The hook portion 200 provided at the lower end portion of the internal portion is engaged with some of the plurality of loops of the engaging portion 100, facilitating the internal portion to be attached at a position according to the purpose or desired position of a passenger.

For example, the purpose of a PBV may be traveling, resting, sleeping, reading, sports, shopping, working or the like. Accordingly, the internal portion, which is provided in the internal space in a PBV, may include a seat, a table, a bed, a book-shelf, exercise equipment and the like. By the vehicular locking unit according to various exemplary embodiments of the present invention, the above-mentioned components may be freely mounted at desired positions in the internal space in the vehicle and may be easily attached and detached, improving passenger convenience.

FIG. 2 is a front view exemplarily illustrating the hook portion of the vehicular locking unit according to various exemplary embodiments of the present invention, which is actuated by a rack-and-pinion mechanism. In the vehicular locking unit according to various exemplary embodiments of the present invention, the hook portion 200 provided at the internal portion of the vehicle may include a plurality of pairs of hooks, and each pair of hooks may be oriented to face each other.

In the vehicular locking unit according to various exemplary embodiments of the present invention, each pair of hooks may be brought close to each other to grab the engaging portion 100, locking the internal portion of the vehicle to the internal member. Meanwhile, the pair of hooks may be opened to release the engaging portion, unlocking the internal portion of the vehicle from the internal member.

The plurality of pairs of hooks may be arranged on a surface of the internal portion of the vehicle to define one or more rows, and the plurality of pairs of hooks included in each row may be actuated together by the locking mechanism 300.

Because the plurality of pairs of hooks is disposed in a recess 250 depressed from a surface of the internal portion of the vehicle, the hooks may not interfere with the surface of the internal member even when a plurality of pairs of hooks are opened.

In other words, because the plurality of pairs of hooks is arranged in rows on the lower end portion of the internal portion, the internal portion is securely fixed to the engaging portion 100 by actuation of the pairs of hooks. Because each pair of hooks is actuated together by one locking mechanism 300, it is possible to conveniently actuate the plurality of pairs of hooks in a desired fashion.

If the hook portion 200, which includes a pair of hooks, is configured to project from the lower end portion of the internal portion, the pair of hooks may interfere with the floor and may thus break or collide even when the pair of hooks is not actuated. To avoid such problems, a recess 250, which is depressed upwards from the lower end portion of the internal portion, is provided, and the hook portion 200 is positioned in the recess 250.

In the vehicular locking unit according to various exemplary embodiments of the present invention, the hook portion 200 may be engaged with or disengaged from the engaging portion 100 by rotating the pair of hooks in opposite directions to each other.

The engaging portion 100 includes a plurality of loops, which are densely arranged on the surface of the internal member such as the floor. The hook portion 200, which is provided on a surface of the internal portion of the vehicle, may be engaged with the engaging portion 100 at a desired location. The hook portion 200 includes a pair of hooks, and the pair of hooks are rotated in opposite directions like forceps, whereby the internal portion is securely fixed to the internal member without being separated from the engaging portion 100.

In the vehicular locking unit according to various exemplary embodiments of the present invention, the engaging portion 100 may be manufactured in a manner similar to that for carpet. A base panel is prepared, and a cord or a wire, which has somewhat high rigidity, is woven through the base panel using a weaving machine or the like such that the engaging portion 100 is continuously formed on the base panel.

When the internal floor of a vehicle is constructed such that the engaging portion 100 is provided throughout the entire floor area, like a carpet, a passenger can feel a detect in which his or her foot is comfortable, offering an effect of a finished floor. Furthermore, when an object such as a seat or a console is fixed to the engaging portion 100, the object may be freely provided at a desired location on the floor, rather than having to install the object at a location.

An object may be maintained at the designated location by its own weight in a general living space. However, in the case of a vehicle, which is continuously moved and shaken, an object freely provided at a desired location must be maintained at the designated location by being securely fixed to the floor of the vehicle. In the event of a collision of a vehicle, because a passenger is safe when an object such as a seat is maintained at a designated location, the present invention offers an effect of satisfying all of the requirements with regard to disposition and safety.

In the vehicular locking unit according to various exemplary embodiments of the present invention, the locking mechanism 300 includes a first pinion 330, which is connected to one of a pair of hooks of the hook portion 200, a second pinion 340, which is connected to the other of the pair of hooks, a first rack 320 engaged with the first pinion 330, and a second rack 322 engaged with the second pinion 340. The first rack 320 and the second rack 322 may be moved in opposite directions to each other.

A third pinion 310 is provided between the first rack 320 and the second rack 322 to be engaged therewith. Accordingly, when the third pinion 310 is rotated, the first rack 320 and the second rack 322 are rotated in opposite directions to each other.

In the vehicular locking unit according to various exemplary embodiments of the present invention, an actuator 305 is provided adjacent to the third pinion 310, and the locking mechanism 300 rotates the third pinion 310 using the actuator 305 in one direction or in the opposite direction to cause the hook portion 200 to be engaged with or disengaged from the engaging portion 100.

In the operation of the locking mechanism 300, the third pinion 310 is rotated by activation of the single actuator 305, and the first rack 320 and the second rack 322 are moved in opposite directions by a rotation of the third pinion 310. Consequently, because the first pinion 330 and the second pinion 340, which are respectively engaged with the first rack 320 and the second rack 322, are rotated in opposite directions, a pair of hooks of the hook portion 200, which are respectively connected to the first pinion 330 and the second pinion 340, are engaged with the engaging portion 100 like forceps, securely attaching the internal portion to the internal member.

Meanwhile, when the rocking mechanism 300 is operated such that the third pinion 310 is rotated by the single actuator 305 in the direction opposite to the direction in which the third pinion 310 is rotated to realize engagement between the hook portion 200 and the engaging portion 100, the hook portion 200 is disengaged from the engaging portion 100, detaching the internal portion from the internal member.

FIG. 3 is a plan view exemplarily illustrating the vehicular locking unit according to various exemplary embodiments of the present invention in which the hook portions are actuated through the rack-and-pinion mechanism. In the vehicular locking unit according to various exemplary embodiments of the present invention, the locking mechanism 300 includes the first and second pinions 330 and 340 connected to the pair of hooks of the hook portion 200, and the first rack and the second rack 320 and 322, which are respectively engaged with the first and second pinions 330 and 340. The pair of hooks of the hook portion 200 are rotated in opposite directions by the first and second pinions 330 and 340, which are rotated by forward or backward movement of the first rack and the second rack 320 and 322, whereby the hooks of the hook portion 200 are engaged with or disengaged from the engaging portion 100.

In the vehicular locking unit according to various exemplary embodiments of the present invention, the hook portion 200 is positioned at a point spaced from the first and second pinions 330 and 340, and the first and second pinions 330 and 340 supply driving force to the hook portion 200 via shafts 350, which connect the first and second pinions 330 and 340 to the hook portion 200.

As is apparent from the above description, in the vehicular locking unit according to various exemplary embodiments of the present invention, because the hook portion provided at an internal portion of a vehicle that needs to be provided in the internal space in the vehicle, is actuated such that the hooks of the hook portion are engaged with or disengaged from the engaging portion provided on the upper surface of the floor of the vehicle, the internal portion of the vehicle is detachably attached to the engaging portion, allowing the internal portion to be freely moved and remounted in the internal space in the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicular locking unit comprising:
an engaging portion provided at an internal member of a vehicle to face an internal space in the vehicle;
a hook portion, which is provided at an internal portion of the vehicle and which is selectively engaged with the engaging portion to attach the internal portion to the internal member in the internal space; and
a locking mechanism, which is provided at the internal portion and which is coupled to the hook portion to selectively actuate the hook portion, whereby the hook portion is engaged with or disengaged from the engaging portion to attach or detach the internal portion to or from the internal member,
wherein the engaging portion includes at least one panel including a plurality of loops provided on an upper surface thereof, and the at least one panel is coupled to a surface of the internal member to define a portion of the internal member.

2. The vehicular locking unit of claim 1,
wherein the engaging portion is positioned on an upper surface of a floor of the vehicle, and the hook portion is provided at a lower portion of the internal portion mounted on the floor.

3. The vehicular locking unit of claim 1,
wherein the hook portion, provided at the internal portion, includes at least one pair of hooks, and the at least one pair of hooks is oriented to face each other.

4. The vehicular locking unit of claim 3,
wherein each pair of the at least one pair of hooks is brought close to each other to grab the engaging portion, thereby locking the internal portion to the internal member, and each pair of the at least one pair of hooks is opened to release the engaging portion, thereby unlocking the internal portion from the internal member.

5. The vehicular locking unit of claim 3,
wherein the at least one pair of hooks include a plurality of pairs of hooks, which is arranged in at least one row, and the plurality of pairs of hooks included in each row is actuated together by the locking mechanism.

6. The vehicular locking unit of claim 3,
wherein the at least one pair of hooks is disposed in a recess depressed from a surface of the internal portion to prevent the at least one pair of hooks from interfering with a surface of the internal member when the at least one pair of hooks is opened.

7. The vehicular locking unit of claim 3,
wherein the at least one pair of hooks is rotated in opposite directions to be engaged with or disengaged from the engaging portion.

8. The vehicular locking unit of claim 7, wherein the locking mechanism includes:
a first pinion connected to one of the at least one pair of hooks;
a second pinion connected to a remaining one of the at least one pair of hooks;
a first rack engaged with the first pinion; and
a second rack engaged with the second pinion,
wherein the first rack and the second rack are moved in opposite directions to each other.

9. The vehicular locking unit of claim 8,
wherein the locking mechanism further includes a third pinion provided between the first rack and the second rack, and
wherein the third pinion is engaged with the first rack and the second rack to move the first rack and the second rack in opposite directions upon rotation to each other thereof.

10. The vehicular locking unit of claim 9,
wherein the first rack and the second rack are arranged in parallel to each other and the first rack is positioned higher than the second rack, and
wherein a diameter of the first pinion engaged to the first rack is larger than a diameter of the second pinion engaged to the second rack.

11. The vehicular locking unit of claim 9,
wherein the locking mechanism further includes an actuator provided coupled to the third pinion, and
wherein the actuator is configured for rotating the third pinion in a first direction or in a second direction opposite to the first direction to engage the hook portion with the engaging portion or to disengage the hook portion from the engaging portion.

12. The vehicular locking unit of claim 3,
wherein the hook portion includes a plurality of pairs of hooks, and
wherein the locking mechanism includes a plurality of pinions respectively connected to the plurality of pairs of hooks and a plurality of racks engaged with respective pinions so that the plurality of pairs of hooks is rotated by the respective pinions, which are rotated by movement of the racks in one direction or in a direction opposite to the one direction, to be engaged with or disengaged from the engaging portion.

13. The vehicular locking unit of claim 12,
wherein each pair of hooks is positioned at a point spaced from two corresponding ones of the plurality of pinions, and receives driving force via shafts respectively connecting the pair of hooks to the two corresponding ones of the plurality of pinions.

\* \* \* \* \*